(12) United States Patent
Hsu (10) Patent No.: US 7,477,643 B2
(45) Date of Patent: Jan. 13, 2009

(54) MEMORY CONTROL METHOD AND RELATED DEVICE

(75) Inventor: Chien-Hua Hsu, Hsin-Chu (TW)

(73) Assignee: Mediatek Incorporation, Science-Based Industrial Park, Hsin-Chu Hsien (TW)

( * ) Notice: Subject to any disclaimer, the term of this patent is extended or adjusted under 35 U.S.C. 154(b) by 738 days.

(21) Appl. No.: 10/905,690

(22) Filed: Jan. 17, 2005

(65) Prior Publication Data

US 2005/0157716 A1 Jul. 21, 2005

(30) Foreign Application Priority Data

Jan. 20, 2004 (TW) .............................. 93101587 A (51) Int. Cl.
*H04L 12/54* (2006.01)
(52) U.S. Cl. .................. 370/392; 370/412; 711/165
(58) Field of Classification Search ................ 370/474, 370/476, 479, 470; 711/165
See application file for complete search history.

(56) References Cited

U.S. PATENT DOCUMENTS

| 6,175,682 | B1 * | 1/2001 | Tanaka et al. ............... 386/92 |
| 6,735,649 | B2 * | 5/2004 | Williams et al. ............... 710/65 |
| 6,795,503 | B2 * | 9/2004 | Nakao et al. ........... 375/240.16 |
| 6,865,656 | B2 * | 3/2005 | Turner et al. ................. 711/165 |
| 7,013,364 | B2 * | 3/2006 | Honda et al. ................. 711/114 |
| 7,103,043 | B2 * | 9/2006 | Kurokawa et al. ........... 370/390 |
| 7,131,048 | B2 * | 10/2006 | Suzuki et al. ............... 714/748 |
| 7,146,455 | B2 * | 12/2006 | Cheng ......................... 711/103 |
| 7,155,601 | B2 * | 12/2006 | Chennupaty et al. ........ 712/300 |
| 2002/0112147 | A1 * | 8/2002 | Chennupaty et al. ........ 712/223 |
| 2002/0166006 | A1 | 11/2002 | Williams et al. |
| 2004/0008975 | A1 * | 1/2004 | Lin ............................. 386/96 |
| 2005/0008240 | A1 * | 1/2005 | Banerji et al. ................ 382/238 |

FOREIGN PATENT DOCUMENTS

CN 1467726 A 1/2004

\* cited by examiner

*Primary Examiner*—Ricky Ngo
*Assistant Examiner*—Ben H Liu
(74) *Attorney, Agent, or Firm*—Winston Hsu (57) ABSTRACT

The present invention provides a memory control method and related device. The method includes storing a bit stream into a memory, reading from the memory a header corresponding to the bit stream, and within a part of a region storing the bit stream, rearranging data stored in the memory according to the header. The rearranging step moves or copies the data in the memory to a part in the region storing the bit stream that has already been read.

12 Claims, 6 Drawing Sheets

MEMORY CONTROL METHOD AND RELATED DEVICE

BACKGROUND OF INVENTION

1. Field of the Invention

The present invention relates to a memory control method and related device, and more particularly, to a memory control method and circuit capable of enhancing buffering performance.

2. Description of the Prior Art

According to new encoding algorithms, encoded data of a frame may be located in another frame due to considerations of output buffering control and bit rate. For example, according to MPEG audio layer 3 (MP3) frame structure, a frame header of a frame includes MP3 side information within the frame, but encoded data of the frame may be located within the preceding frame. In another example, according to Ogg page structure, which is a developing specification, a page header of a page may introduce a plurality of packets coming after. The last packet of the page may include a portion of packet data packed within the page due to reasons such as buffer size limit and bit rate control. The unpacked portion of the packet data may be further packed as a continued packet next to a page header of the next page. It is a common problem of the above-mentioned algorithms, the MP3 frame structure and the Ogg page structure, that encoded data of the same frame or the same page are divided into two portions because of the header between two adjacent frames or pages. As a result, decoding encoded data that is not arranged continuously is not easy as decoding encoded data that is arranged continuously.

Figure 1:
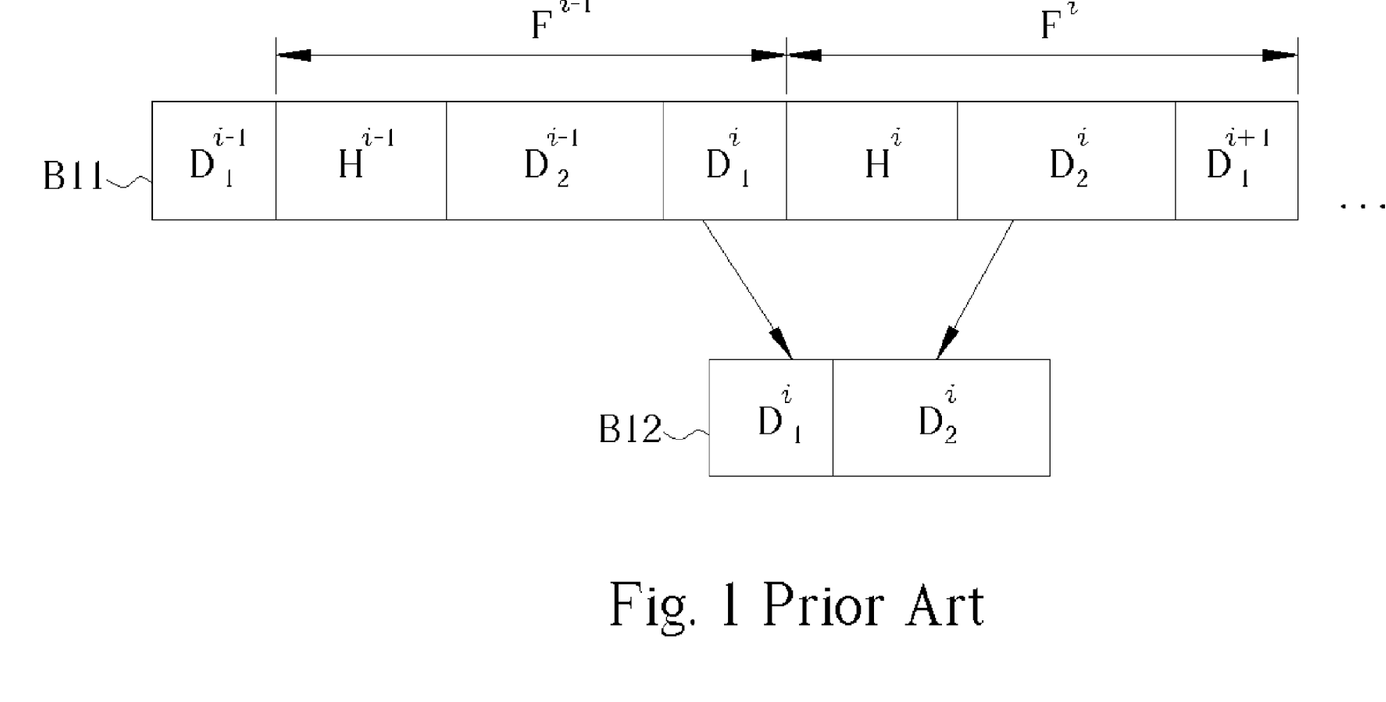
FIG. 1 is an operational diagram of a buffering control method according to the prior art.
Figure 2:
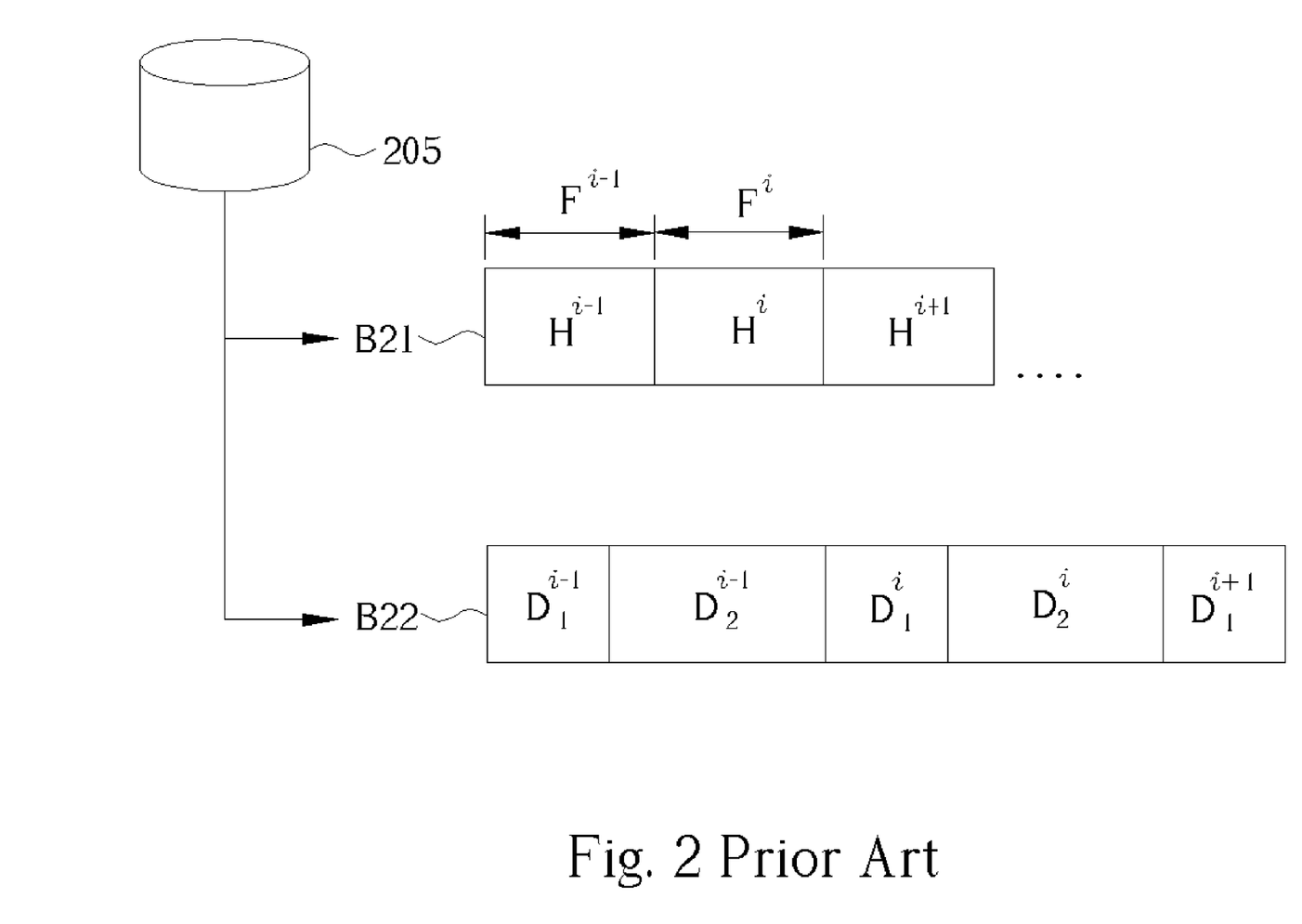
FIG. 2 is an operational diagram of another buffering control method according to the prior art.

FIG. 1 illustrates a buffering control method for a decoding process according to the prior art, wherein $F^i$ denotes an $I^{th}$ frame, $F^{i-1}$ denotes an $(I-1)^{th}$ frame, and so forth. A header $H^i$, data $D^i_1$, $D^i_2$, and the frame $F^i$ stored in a buffering region B11 have the same superscript i, representing that the header $H^i$ and the data $D^i_1$, $D^i_2$ logically belong to the frame $F^i$. Additionally, the subscripts 1, 2 of the data $D^i_1$, $D^i_2$ represent two portions 1, 2 of the data $D^i$, which includes the data $D^i_1$, $D^i_2$, divided by the header $H^i$ between the two adjacent frames $F^i$, $F^{i-1}$. Regarding to the above-mentioned problem that the encoded data is not arranged continuously, the buffering control method shown in FIG. 1 further allocates another buffering region B12, in contrast to the region B11, for storing a bit stream needing to be decoded. According to the buffering control method shown in FIG. 1, the data $D^i_1$, $D^i_2$ are copied to the buffering region B12 to form within the buffering region B12 continuously arranged data $D^i_1$, $D^i_2$ for further decoding. As the buffering control method shown in FIG. 1 further allocates the additional buffering region B12, the storage volume requirement of the memory is increased, even if the buffering regions B11, B12 are allocated within the same memory. FIG. 2 illustrates another buffering control method according to the prior art. The buffering control method shown in FIG. 2 parses a data flow read from a disk 205 and respectively store headers $H^{i-1}$, $H^i$, . . . and data $D^{i-1}_1$, $D^{i-1}_2$, $D^i_1$, $D^i_2$, . . . in buffering regions B21, B22. Regarding to some embedded systems, it is inconvenient to implement the buffering control method shown in FIG. 2. Both methods of FIG. 1, 2 are imperfect.

SUMMARY OF INVENTION

It is therefore an objective of the present invention to provide a memory control method and a related device to solve the above-mentioned problems.

The present invention provides a memory control method. The memory control method includes storing a bit stream into a memory, reading from the memory a header corresponding to the bit stream, and within a part of a region storing the bit stream, rearranging data stored in the memory according to the header.

The present invention further provides a memory control circuit corresponding to the above-mentioned memory control method. The memory control circuit includes a memory for storing a bit stream, a header parser coupled to the memory for reading from the memory a header corresponding to the bit stream, and a rearrangement unit couple to the memory and the header parser for rearranging data stored in the memory according to the header within a part of a region storing the bit stream.

It is an advantage of the present invention that the memory control method and circuit form continuously arranged data for further decoding in the region storing the bit stream so that, for decoding, it is not necessary to allocate another region in contrast to the region storing the bit stream or to install another memory in addition to the memory for storing the bit stream. As a result, the storage volume of the memory is cost-effective.

These and other objectives of the present invention will no doubt become obvious to those of ordinary skill in the art after reading the following detailed description of the preferred embodiments that are illustrated in the various figures and drawings.

DETAILED DESCRIPTION

Figure 3:
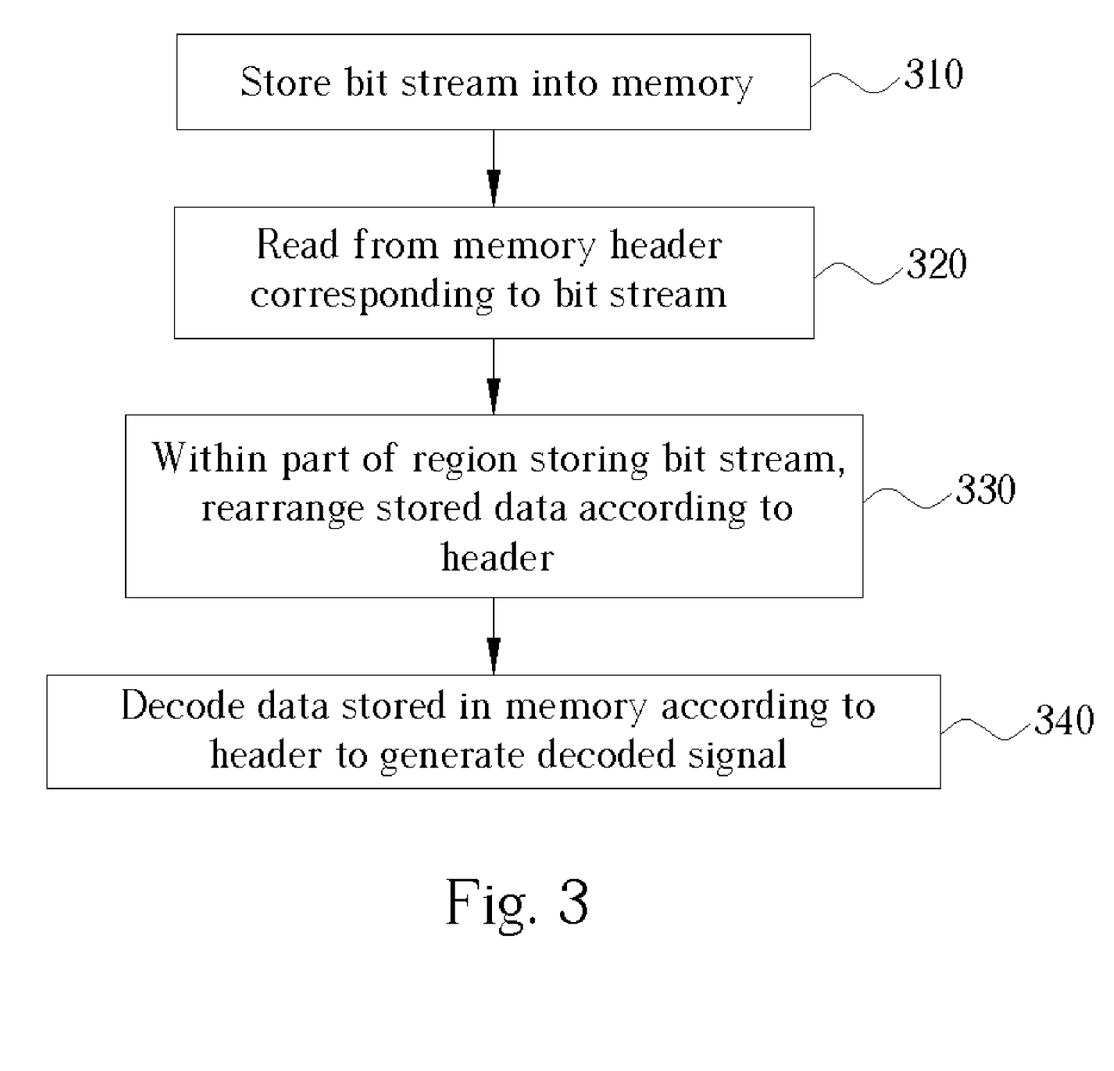
FIG. 3 is a flowchart of a memory control method according to the present invention.
Figure 4:
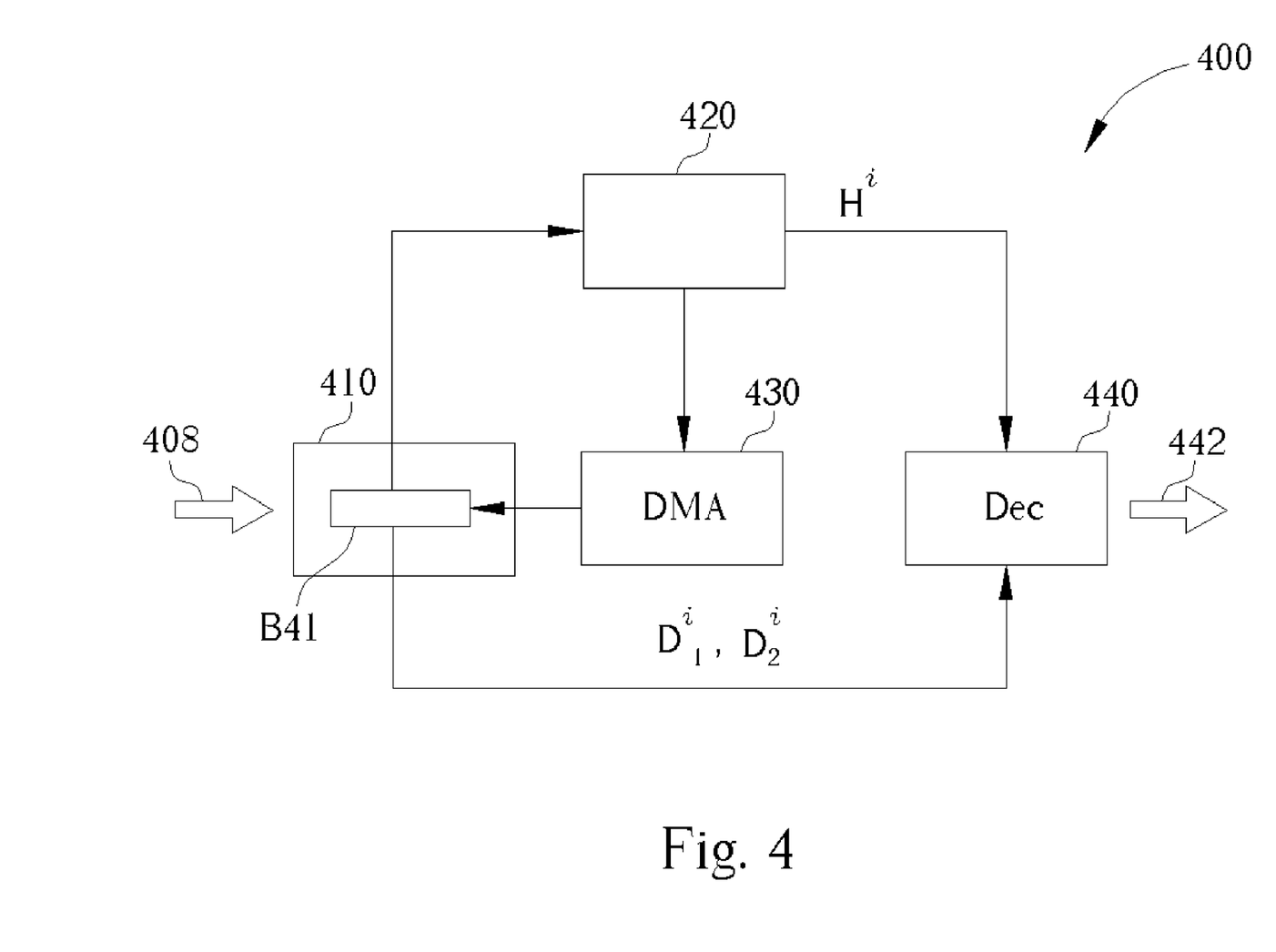
FIG. 4 is a diagram of a memory control circuit according to the present invention.
Figure 5A:
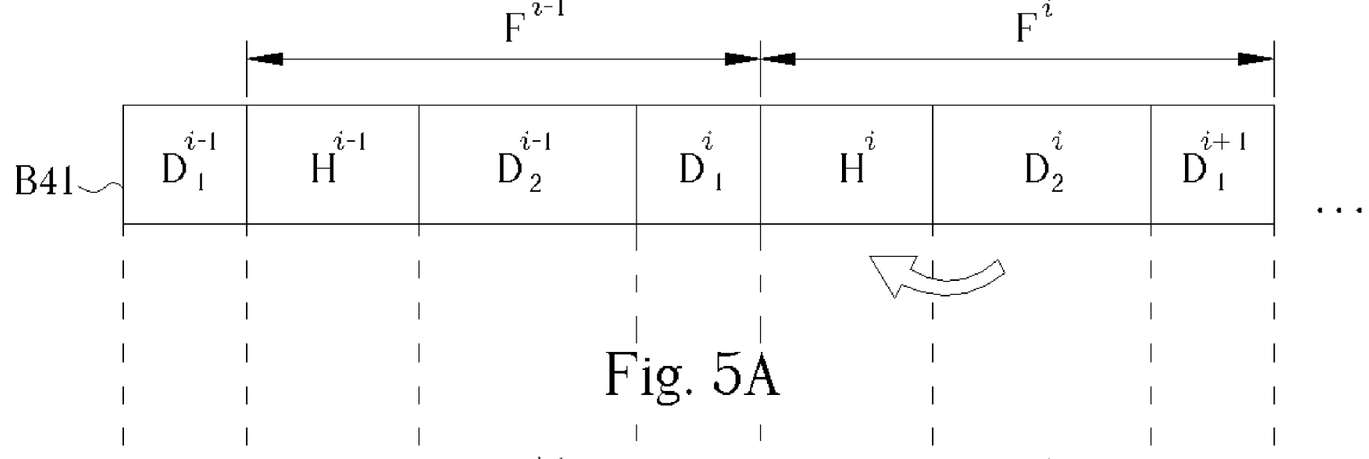
FIG. 5 is an operational diagram of the memory control method shown in FIG. 3 according to a first embodiment of the present invention.

Please refer to FIGS. 3, 4, and 5A, which is the first half portion of FIG. 5. FIG. 3 is a flowchart of a memory control method according to the present invention, FIG. 4 is a diagram of a memory control circuit according to the present invention, and FIG. 5A illustrates a buffering region B41 used in the memory control method shown in FIG. 3 according to a first embodiment of the present invention. In FIG. 5A, $F^i$ denotes an $I^{th}$ frame, $F^{i-1}$ denotes an $(I-1)^{th}$ frame, and so forth. Similar notations are used for comparing the present invention to the prior art. Within the buffering region B41, the data $D^{i-1}_1$, the header $H^{i-1}$, the data $D^{i-1}_2$, $D^i_1$, the header $H^i$, the data $D^i_2$, $D^{i+1}_1$, . . . are stored in the same order as that of corresponding data and headers in a bit stream 408 shown in FIG. 4. That is, the contents $D^{i-1}_1$, $H^{i-1}$, $D^{i-1}_2$, $D^i_1$, $H^i$, $D^i_2$, $D^{i+1}_1$, . . . stored in the buffering region B41 shown in FIG. 5A is the raw information of the bit stream 408 without any processing. Regarding to the above-mentioned raw information, the present invention provides a memory control method capable of enhancing buffering control efficiency. The memory control method is described using the following steps, however, the order of the steps is not a limitation of the present invention.

Step 310: Store a bit stream 408 into a memory 410.

Step 320: Read from the memory 410 a header $H^i$ corresponding to the bit stream 408 using a header parser 420.

Step 330: Within a part $F^i$ of a region B41 storing the bit stream 408, rearrange the data $D^i_2$ stored in the memory 410 according to the header $H^i$ using a rearrangement unit 430.

Step 340: Decode the data $D^i_1$, $D^i_2$ stored in the memory 410 according to the header $H^i$ using a decoder 440 to generate a decoded signal 442.

For implementing the rearrangement unit 430 of the present invention, a specific circuit such as a Direct Memory Access (DMA) module or a program executed on a CPU are both applicable. As shown in FIG. 4, the rearrangement unit 430 of this embodiment is a DMA module. According to this embodiment, as the header $H^i$ includes explicit or implicit information regarding the location and the length of the data $D^i_2$ within the frame $F^i$, the header parser 420 derives the location and the length of the data $D^i_2$ after reading the header $H^i$ in step 320. In step 330, according to the location and the length of the data $D^i_2$ outputted by the header parser 420, the rearrangement unit 430 moves or copies the data $D^i_2$ to the memory region which has already been read, i.e. the region originally storing the header $H^i$ shown in FIG. 5A, so that, in the memory 410, the moved or copied data $D^i_2$ and the data $D^i_1$ corresponding to the bit stream 408 form continuously arranged data $D^i_1$, $D^i_2$. The result of the buffering control mentioned above is shown as the second half portion of FIG. 5, i.e. FIG. 5B. Please note, whether the old data shown having a diagonal pattern in FIG. 5B should be deleted or not while rearranging the data $D^i_2$ depends on implementation choices of the present invention and is not a limitation of the present invention. As step 330 may copy or move the data $D^i_2$ starting from the beginning of the data $D^i_2$ in at least one smaller unit, even if the displacement of the moved or copied data $D^i_2$ is smaller than the length of the data $D^i_2$, it does not hinder the implementation of the present invention. The above-mentioned smaller unit can be a combination of smaller units of different sizes, and the smaller units can be a bit, a byte, a plurality of bits, a plurality of bytes, . . . being up to the length of the header $H^i$.

The steps 310, 320, 330, 340 of the memory control method performed with respect to the frame $F^i$ are applicable for each of the frames $F^1, F^2, \ldots, F^{i-1}, F^i, F^{i+1}, \ldots$ except for the initial frame $F^0$. As mentioned, the header $H^i$ includes the explicit or implicit information of the location and the length of the data $D^i_2$, and similarly, the header $H^{i-1}$ of the frame $F^{i-1}$, which was read previously, includes the explicit or implicit information of the location and the length of the data $D^i_1$. Therefore, the decoder 440 may decode the continuously arranged data $D^i_1$, $D^i_2$ shown in FIG. 5B according to the explicit or implicit information of the locations and the lengths of the data $D^i_1$, $D^i_2$, wherein the explicit or implicit information is outputted by the header parser 420. Please note, the data $D^0$ of the above-mentioned initial frame $F^0$ is a continuously arranged data within the initial frame $F^0$, so it is unnecessary to perform step 330 with respect to the initial frame $F^0$. Step 340 decodes the data $D^0$ stored in the memory 410 according to the header $H^0$ using the decoder 440 to generate the decoded signal 442.

Regarding the order of the data $D^{i-1}_1$, the header $H^{i-1}$, the data $D^{i-1}_2$, $D^i_1$, the header $H^i$, the data $D^i_2$, $D^{i+1}_1$, . . . stored in the buffering region B41 shown in FIG. 5A, the present invention according to the first embodiment illustrated above is suitable for the MP3 specification, the MPEG2 multichannel extension frame specification, the Ogg page structure specification, or their variances. Regardless of whether the bit stream 408 is encoded in accordance with the MP3 specification, the MPEG2 multichannel extension frame specification, the Ogg page structure specification, or another specification, the first embodiment illustrates that the locations of the header $H^i$ and the data $D^i_2$ needing to be moved or copied correspond to the same frame or packet of the bit stream 408 before the rearrangement performed in step 330.

Figure 5B:
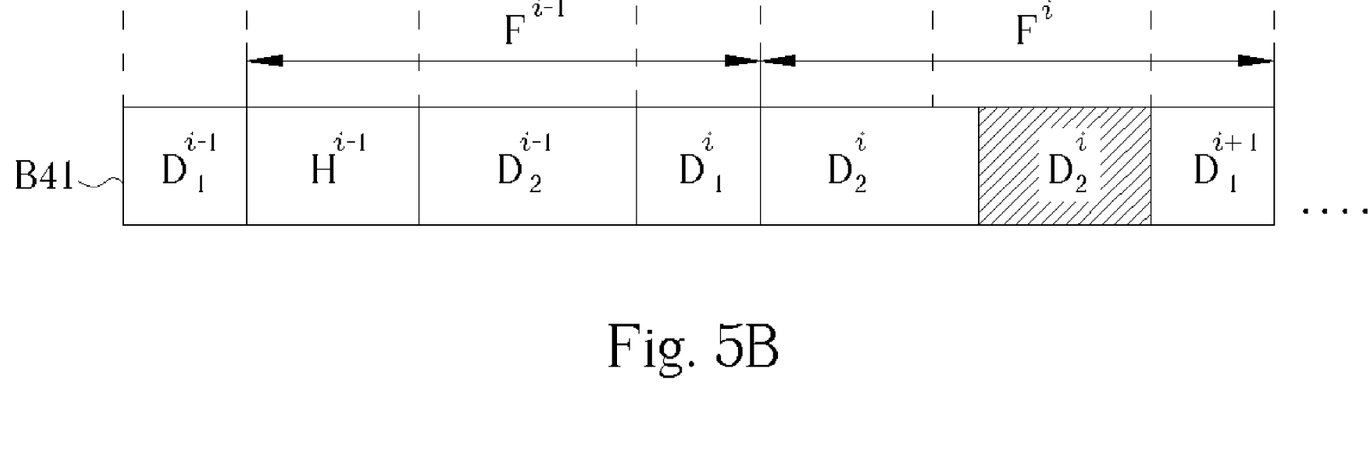

Referring to FIG. 4 and FIG. 5, the present invention further provides a memory control circuit 400 corresponding to the above-mentioned memory control method according to the first embodiment. The memory control circuit 400 includes the memory 410 for storing the bit stream 408, the header parser 420 coupled to the memory 410 for reading from the memory 410 the header $H^i$ corresponding to the bit stream 408, and the rearrangement unit 430 couple to the memory 410 and the header parser 420 for rearranging the data $D^i_2$ stored in the memory 410 according to the header $H^i$ within the part $F^i$ of the region B41 storing the bit stream 408. The memory control circuit 400 further includes the decoder 440 coupled to the memory 410 and the header parser 420 for decoding the data $D^i_1$, $D^i_2$ stored in the memory 410 according to the header $H^i$ to generate the decoded signal 442. In this embodiment, the header parser 420 and decoder 440 are installed in an integrated unit, and the rearrangement unit 430 moves or copies the data $D^i_2$ to the part which is already read in the region B41 storing the bit stream 408 so that, in the memory 410, the moved or copied data $D^i_2$ and the data $D^i_1$ corresponding to the bit stream 408 form the continuously arranged data $D^i_1$, $D^i_2$ as shown in FIG. 5B. As mentioned, regardless of whether the bit stream 408 is encoded in accordance with the MP3 specification, the MPEG2 multichannel extension frame specification, the Ogg page structure specification, or another specification, the first embodiment illustrates that the locations of the header $H^i$ and the data $D^i_2$ needing to be moved or copied correspond to the same frame or packet of the bit stream 408 before the rearrangement performed by the rearrangement unit 430.

A second embodiment shown in FIG. 6 is similar to the first embodiment shown in FIG. 5 with the exceptions described in the following paragraphs. According to the second embodiment, the description of step 330 is revised as follows:

Step 330': Within a part $F^{i-1}$, $F^i$ of a region B41 storing the bit stream 408, rearrange the data $D^i_1$ stored in the memory 410 according to the header $H^i$ using the rearrangement unit 430.

As the header $H^i$ includes explicit or implicit information of the location and the length of the data $D^i_2$ within the frame $F^i$, the header parser 420 derives the location and the length of the data $D^i_2$ after reading the header $H^i$ in step 320. The steps 310, 320, 330', 340 of the memory control method performed with respect to the frame $F^i$ are applicable for each of the frames $F^1, F^2, \ldots, F^{i-1}, F^i, F^{i+1}, \ldots$. Therefore, in step 330', according to the locations and the lengths of the data $D^i_1$, $D^i_2$ outputted by the header parser 420, the rearrangement unit 430 moves or copies the data $D^i_1$ to the memory region which has already been read, i.e. the region originally storing the header $H^i$ shown in FIG. 6A, so that, in the memory 410, the moved or copied data $D^i_1$ and the data $D^i_2$ corresponding to the bit stream 408 forms continuously arranged data $D^i_1$, $D^i_2$. The result of the buffering control mentioned above is shown as FIG. 6B. Please note, whether the old data shown having diagonal pattern in FIG. 6B should be deleted or not while rearranging the data $D^i_1$ depends on implementation choices of the present invention and is not a limitation of the present invention. As mentioned, the header $H^i$ includes the explicit or implicit information of the location and the length of the data $D^i_2$. The header $H^{i-1}$ of the frame $F^{i-1}$, which has been previously read, includes the explicit or implicit information of the location and the length of the data $D^i_1$. Therefore, the decoder 440 may decode the continuously arranged data $D^i_1$, $D^i_2$ shown in FIG. 6B according to the explicit or implicit information of the locations and the lengths of the data $D^i_1$, $D^i_2$, wherein the explicit or implicit information is outputted by the header parser 420. Regarding the new location of the data $D^i_1$ shown in FIG. 6B, the data $D^i_1$ is located prior to the data $D^i_2$ with the end of the data $D^i_1$ adjacent to the beginning of the data $D^i_2$, and the displacement from the beginning of the data $D^i_2$ to the beginning of the data $D^i_1$ is equal to the length of the data $D^i_1$. As step 330' may copy or move the data $D^i_1$ starting from the end of the data $D^i_1$ in at least one smaller unit, even if the displacement is greater than the length of the header $H^i$, it does not hinder the implementation of the present invention. The above-mentioned smaller unit can be a combination of smaller units of different sizes, and the smaller units can be a bit, a byte, a plurality of bits, a plurality of bytes, ... being up to the length of the header $H^i$. Additionally, according to the second embodiment, the decoder 440 calculates the displacement. This is an implementation choice of the present invention. In another embodiment of the present invention, the header parser 420 may calculate the displacement and then output the displacement into the decoder 440.

Figure 6A:
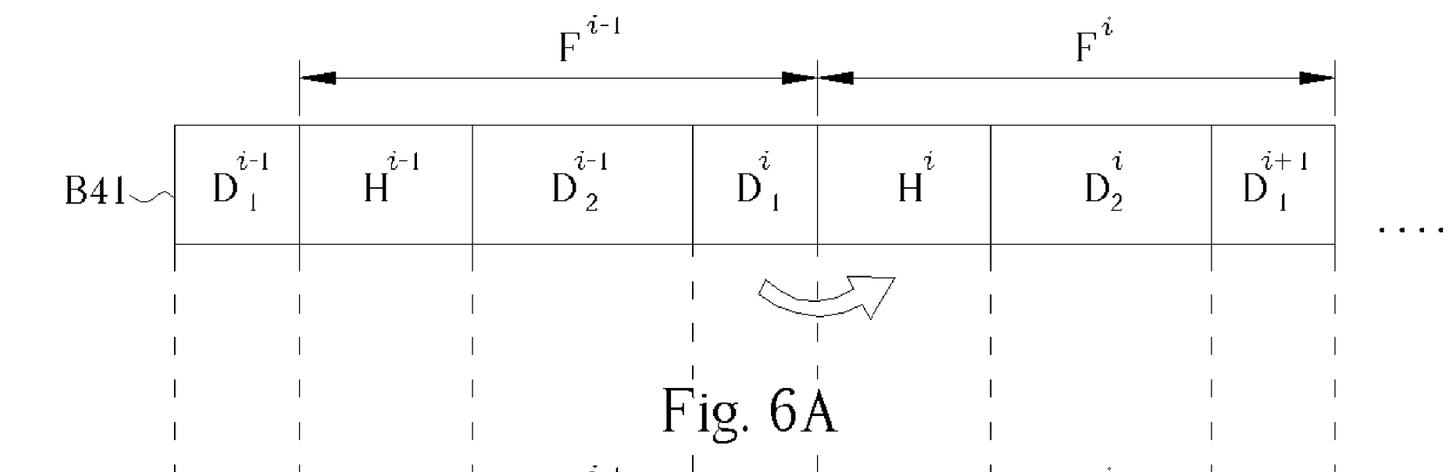
FIG. 6 is an operational diagram of the memory control method shown in FIG. 3 according to a second embodiment of the present invention.
Figure 6B:
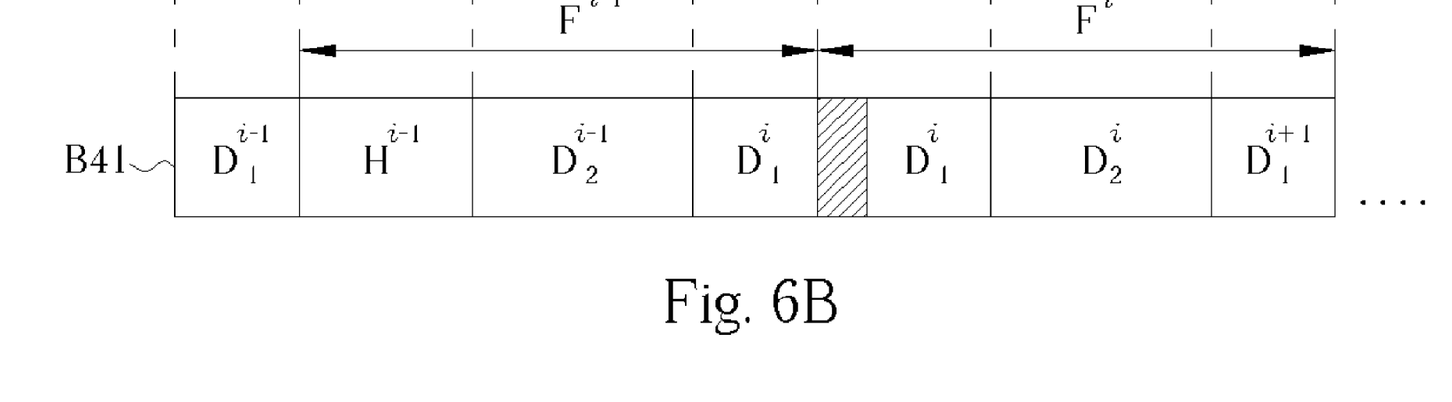

Regarding the order of the data $D^{i-1}_1$, the header $H^{i-1}$, the data $D^{i-1}_2$, $D^i_1$, the header $H^i$, the data $D^i_2$, $D^{i+1}_1$, ... stored in the buffering region B41 shown in FIG. 6A, the present invention according to the second embodiment illustrated above is suitable for the MP3 specification, the MPEG2 multichannel extension frame specification, the Ogg page structure specification, or their variances. Regardless of whether the bit stream 408 is encoded in accordance with the MP3 specification, the MPEG2 multichannel extension frame specification, the Ogg page structure specification, or other specifications, the second embodiment illustrates that the locations of the header $H^i$ and the data $D^i_2$ needing to be moved or copied respectively correspond to two adjacent frames or packets of the bit stream 408 before the rearrangement of step 330'.

As mentioned in the first embodiment and the second embodiment, the header $H^i$ includes the explicit or implicit information of the location and the length of the data $D^i_2$, and the header $H^{i-1}$ of the frame $F^{i-1}$ includes the explicit or implicit information of the location and the length of the data $D^i_1$. This is an implementation choice of the present invention. While applying different encoding specifications using the present invention, the above-mentioned description corresponding to the implementation choice may vary. In another embodiment of the present invention, the header $H^{i-1}$ includes the explicit or implicit information of the location and the length of the data $D^i_2$ within the frame $F^i$. In another embodiment of the present invention, the header $H^i$ includes the explicit or implicit information of the location and the length of the data $D^i_1$ within the frame $F^i$. Please note, the above-mentioned explicit information refers to the information directly recoded in the headers, and the above-mentioned implicit information refers to the information being values, codes, indexes, etc. having implicit meanings and recoded in the headers. The above-mentioned implicit information of the location and the length can be derived from lookup tables or calculations.

In contrast to the prior art, the memory control method and circuit form continuously arranged data for further decoding in the region storing the bit stream so that, for decoding, it is not necessary to allocate another region in contrast to the region storing the bit stream or to install another memory in addition to the memory for storing the bit stream. As a result, the storage volume of the memory is cost-effective.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A memory control method, the memory control method comprising:
    (a) storing a bit stream into a memory;
    (b) reading from the memory a header corresponding to the bit stream; and
    (c) within a part of a region storing the bit stream, rearranging data stored in the memory according to the header by moving or copying the data to a part in the region storing the bit stream that has already been read;
    wherein the data is a second data corresponding to the bit stream; and step (c) moves or copies the second data to the part that has already been read so that, in the memory, the moved or copied second data and a first data corresponding to the bit stream form continuously arranged data.

2. The memory control method of claim 1, wherein before the rearrangement performed in step (c), locations of the header and the data needing to be moved or copied correspond to the same frame or packet of the bit stream.

3. The memory control method of claim 1, wherein before the rearrangement of step (c), locations of the header and the data needing to be moved or copied respectively correspond to two adjacent frames or packets of the bit stream.

4. The memory control method of claim 1, wherein the bit stream is encoded in accordance with the MPEG2 multichannel extension frame specification, the MPEG audio layer 3 (MP3) specification, or the Ogg page structure specification.

5. The memory control method of claim 1, further comprising:
    decoding data stored in the memory according to the header.

6. A memory control circuit, the memory control circuit comprising:
    a memory for storing a bit stream;
    a header parser coupled to the memory for reading from the memory a header corresponding to the bit stream; and
    a rearrangement unit coupled to the memory and the header parser for rearranging data within a part of a region storing the bit stream in the memory according to the header by moving or copying the data to a part in the region storing the bit stream that has already been read;
    wherein the data is a second data corresponding to the bit stream; and the rearrangement unit moves or copies the second data to the part that has already been read so that, in the memory, the moved or copied second data and a first data corresponding to the bit stream form continuously arranged data.

7. The memory control circuit of claim 6, wherein before the rearrangement performed by the rearrangement unit, locations of the header and the data needing to be moved or copied correspond to the same frame or packet of the bit stream.

8. The memory control circuit of claim 6, wherein before the rearrangement performed by the rearrangement unit, locations of the header and the data needing to be moved or copied respectively correspond to two adjacent frames or packets of the bit stream.

9. The memory control circuit of claim 6, wherein the bit stream is encoded in accordance with the MPEG2 multichannel extension frame specification, the MPEG audio layer 3 (MP3) specification, or the Ogg page structure specification.

10. The memory control circuit of claim 6, further comprising:
a decoder coupled to the memory and the header parser for decoding data stored in the memory according to the header.

11. The memory control circuit of claim 10, wherein the header parser and the decoder are installed in an integrated unit.

12. The memory control circuit of claim 6, wherein the rearrangement unit is a Direct Memory Access (DMA) module.

* * * * *